3,338,854
EPOXY RESIN-OXIDIZED ASPHALT RESIN
COMPOSITION
John A. Hedge, Secane, and Ralph Zaayenga, West
Chester, Pa., assignors to Sun Oil Company, Philadelphia, Pa., a corporation of New Jersey
No Drawing. Filed Jan. 7, 1964, Ser. No. 336,142
3 Claims. (Cl. 260—28)

ABSTRACT OF THE DISCLOSURE

A polyepoxide composition is extended and cured with a single material. This is accomplished by adding 50-95 weight percent of an oxidized $C_3$–$C_{10}$ hydrocarbon soluble asphalt fraction containing 1–5 carboxyl groups to the polyepoxide. For example, 0.25 gram of a diglycidyl ether of bisphenol is mixed with 1 gram of nitric acid-oxidized maltenes from Lagomedio crude residuum which contain after oxidation 2.41 carboxyl groups per molecule. This mixture was cured by heating for five hours at 150° C. to give a tough benzene insoluble coating.

---

This invention relates to a heat-cured asphalt resin-epoxy resin composition and to a process for making the same.

Numerous polyepoxide containing compositions have been described in the literature. They are in use as coatings, potting compounds, as solvent resistant toppers for paving and in other areas of utility where a tough, insoluble wear-resistant material is required. Use of these materials has been hindered by their high cost. Furthermore, attempts to provide low cost materials have resulted in brittle products and incompletely cured products. We have developed a high performance, low-cost polyepoxide containing material which can be heat cured without employing a conventional curing agent.

Our invention is based on the finding that when the resin fraction of asphalt is oxidized with nitric acid, the oxidized material unites with a polyepoxide at a temperature of 100° C. to 300° C. to provide a cured product which is essentially insoluble in benzene.

Asphalts are colloidal systems in which the components of higher molecular weight constitute the disperse phase and the components of lower molecular weight constitute the continuous phase. When asphalt is diluted with an excess of a $C_3$–$C_{10}$ hydrocarbon solvent, the solids separate out. The insolubles are known as asphaltenes and the solubles are known as maltenes or petrolenes. The nature of any separation of asphaltenes and petrolenes is determined by the solvent, conditions, etc. The maltene or petrolene fraction can be separated into a predominantly aliphatic saturated oil fraction and a predominantly aromatic resin fraction by adsorption on alumina or solvent extraction. The technique of separating asphalt is fully described in patents and the literature. Standard texts include Pfeiffer: The Properties of Asphaltic Bitumen, Elsevier, 1950, and Abraham: Asphalts and Allied Substances, sixth edition, Van Nostrand, 1960.

The asphalt derived aromatic resin fraction used in the present invention can be the whole maltene or petrolene fraction or a resin fraction from which the oils have been removed. Somewhat less desirable materials are whole asphalts containing less than 5 vol. percent asphaltenes. Whole asphalts containing more than 5 vol. percent asphaltenes are not suitable because the cured resins containing them are too brittle. Preferred solvents for separating asphaltenes from asphalts include the $C_5$–$C_8$ saturated hydrocarbons, i.e., pentane, hexane, heptane, etc. The aromatic resin fraction can contain 30-100 wt. percent aromatic resin, 0–70 wt. percent oils and 0–5 wt. percent asphaltenes.

The epoxy resin component of the composition of the invention contains the ethoxyline ring structure

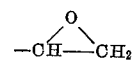

commonly called epoxy and cross-linking occurs through these groups. Suitable epoxy resins are polyepoxyethers having more than one epoxy group. Therefore, glycidyl polyethers of polyhydric phenols having an epoxide equivalent in the 170 to 4,000 range, preferably 170 to 250, are used. The meaning of the term epoxide equivalent and a guide to the selection of epoxy resins for use in this invention can be found in the text Epoxy Resins, Lee and Neville, McGraw-Hill, 1957. The epoxy resin is used in amounts ranging from 5 to 50 wt. percent.

Although the oxidized asphalt derived resins cure the epoxy resins with heat alone, it may be desirable to use a catalyst to speed the cure and to permit the use of lower cure temperatures. The catalyst may be an acid or a base. Examples include alkali metal hydroxides and tertiary amines.

The oxidation step is carried out with nitric acid. Acids having concentrations of 10–100% are suitable. The acid can be employed in amounts ranging from 10 to 50 wt. percent (anhydrous basis) based on the resin feed. If sulfonic acid groups are desired on the resin, concentrated sulfuric acid can be employed in amounts of from 2 to 10 wt. percent based in the resin.

Oxidation conditions include a temperature range of 0 to 200° C., pressures ranging from 10 to 100 p.s.i.a. and reaction times of 1 to 20 hours. $C_4$–$C_{10}$ saturated hydrocarbon solvents can be used if desired. The preferred conditions are atmospheric pressure and refluxing temperature.

Following oxidation the products are cooled, washed with water, contacted with a $C_4$–$C_{10}$ saturated hydrocarbon solvent and dried. The insoluble oxidation products are recovered in amounts ranging from 30 to 70 wt. percent based on the total product.

The oxidized asphalt derived resins contain a plurality, e.g., from 1 to 5 carboxyl groups, per molecule. When sulfuric acid is used to add sulfonic acid groups, the total number of acid groups is increased by 1–3. The number of acid groups is determined by total acid number determination (ASTM D–664–54).

The invention is further illustrated by the following non-limiting examples:

Example 1

This example describes the preparation of a maltene fraction for oxidation.

A Lagomedio crude oil was vacuum distilled to produce a residuum having the following properties:

Specific gravity _____ 1.01
Penetration—32° F. _____ 41
Penetration—77° F. _____ 141
Softening point (ring and ball) ° F. _____ 100
Solubility, $CCl_4$ _____ 99.69
Solubility 86° F. naphtha _____ 84.9

The residuum was extracted with about 20 volumes of n-hexane at 70° F. The asphaltenes which are insoluble in the solvent were filtered out. The maltene product was a black semisolid having a ring and ball softening point of 73.5° F. and a molecular weight of 890. The fraction contained 35 percent oils and 65 percent resins. If desired, the oils can be separated from the resins by chromatography, however, this is not necessary. The oils are not significantly oxidized by nitric acid.

Example 2

The maltene fraction of the previous example was oxidized in the following manner:

One hundred and 10 grams of the maltenes were mixed with 70 milliliters of 40 percent nitric acid. The acid was added drop-wise over a period of approximately one hour. The oxidation was carried out at refluxing temperature (100°–105° C.) and atmospheric pressure in a glass reactor equipped with a motor-driven stirrer. The oxidation was terminated after four hours. One hundred and thirty grams of the oxidized product was recovered and 67 percent of this material was hexane insoluble. The insoluble oxidized resin had a molecular weight of 1877 and a total acid number of 72 (ASTM D–664–54). The product contained 2.41 carboxylic groups per molecule—calculated.

Example 3

A cured product was prepared as follows:

One gram of oxidized resins was blended with 0.25 gram of Ciba "Araldite 502." The latter polyepoxide is a diglycidyl ether of bisphenol A having an epoxide equivalent of 232–50, an epoxy value (equivalents per 100 gram) of 0.40–0.43, and a viscosity at 25° C. of 3000 centipoises. A film of material was deposited on a steel plate and cured for five hours at 150° C. A tough benzene insoluble coating resulted. It is important to note that no curing agent was employed.

Example 4

The following example describes a maltene oxidation wherein both carboxylic acid groups and sulfonic acid groups are introduced into the maltene fraction.

Three hundred and twenty-three grams of maltenes prepared in the manner set forth in Example 1 where dissolved in 800 milliliters in hexane. 102.4 milliliters of 70 percent nitric acid and 8 milliliters of concentrated sulfuric acid were added at 0° C. over a period of about 45 minutes. The oxidation was then conducted at 0° C. for approximately one hour. Three hundred and twenty-nine grams of the product were recovered of which 142 grams were hexane insoluble. The hexane insolubles had a molecular weight of 2380, a total acid number of 121 and contained approximately 5.0 carboxylic acid and sulfonic acid groups per molecule. The product had the following analysis:

| | |
|---|---|
| C | 62.4 |
| H | 7.28 |
| O | 19.87 |
| N | 5.29 |
| S | 5.96 |

Example 5

One gram of the oxidized resin containing both carboxylic acid and sulfuric acid groups was mixed with 0.25 gram of the polyepoxide employed in Example 3. The material was coated on a steel plate and cured in 22 hours at 70° F. to a tough insoluble coating. When the same mixture of oxidized resins and polyepoxide was heated a 110°–150° C., a foam resulted having a density of approximately 5–7 pounds per cubic foot.

Example 6

Asphalt which was air blown to a 250° F. softening point was mixed with epoxy in the manner shown in Examples 3 and 5. This mixture would not cure upon heating at 110°–150° C. Thus, air blown asphalt is not comparable in any way to the oxidized resins from asphalt employed in our compositions.

The foregoing disclosure and examples show that a high performance curing agent for epoxy resins can be made from a low-cost asphalt resin.

The invention is subject to various modifications such as the addition of diluents, fillers, plasticizers, flexibilizers and dyes. The cured products of the invention are suited for casting, potting, encapsulation, sealing and coating. They can be foamed if desired.

We claim:

1. A composition consisting essentially of 50–95 weight percent of the oxidized $C_3$–$C_{10}$ hydrocarbon soluble fraction of asphalt, said fraction containing from 1 to 5 carboxyl groups per molecule and 5–50 weight percent of a polyepoxide having more than one epoxy group.

2. A composition consisting essentially of 5–50 weight percent of a polyepoxide having more than one epoxy group and 50–95 weight percent of a curing agent prepared by contacting $C_3$–$C_{10}$ hydrocarbon soluble asphalt resins with nitric acid at oxidizing conditions and recovering an oxidized asphalt resin curing agent containing a plurality of carboxyl groups.

3. A process for curing polyepoxides having more than one epoxy group comprising mixing from 5–50 weight percent polyepoxide with from 50–95 weight percent of oxidized $C_3$–$C_{10}$ hydrocarbon soluble asphalt resin fraction containing 1–5 carboxyl groups and heating the mixture at a temperature in the range of 100–300° C.

References Cited

UNITED STATES PATENTS

| | | | |
|---|---|---|---|
| 3,015,635 | 1/1962 | Bradley et al. | 260—28 |
| 3,096,192 | 7/1963 | Pitchford | 208—44 |
| 3,222,280 | 12/1965 | Wolfram et al. | |

MORRIS LIEBMAN, *Primary Examiner.*

B. A. AMERNICK, *Assistant Examiner.*